Figure 3:
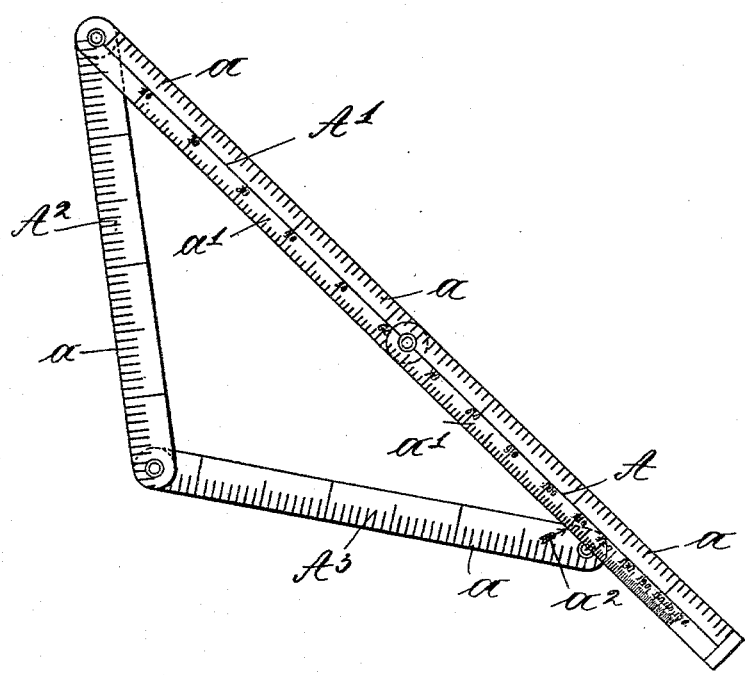

(No Model.) 2 Sheets—Sheet 1.
O. SCHUBERT.
JOINT MEASURING SCALE.
No. 597,330. Patented Jan. 11, 1898.
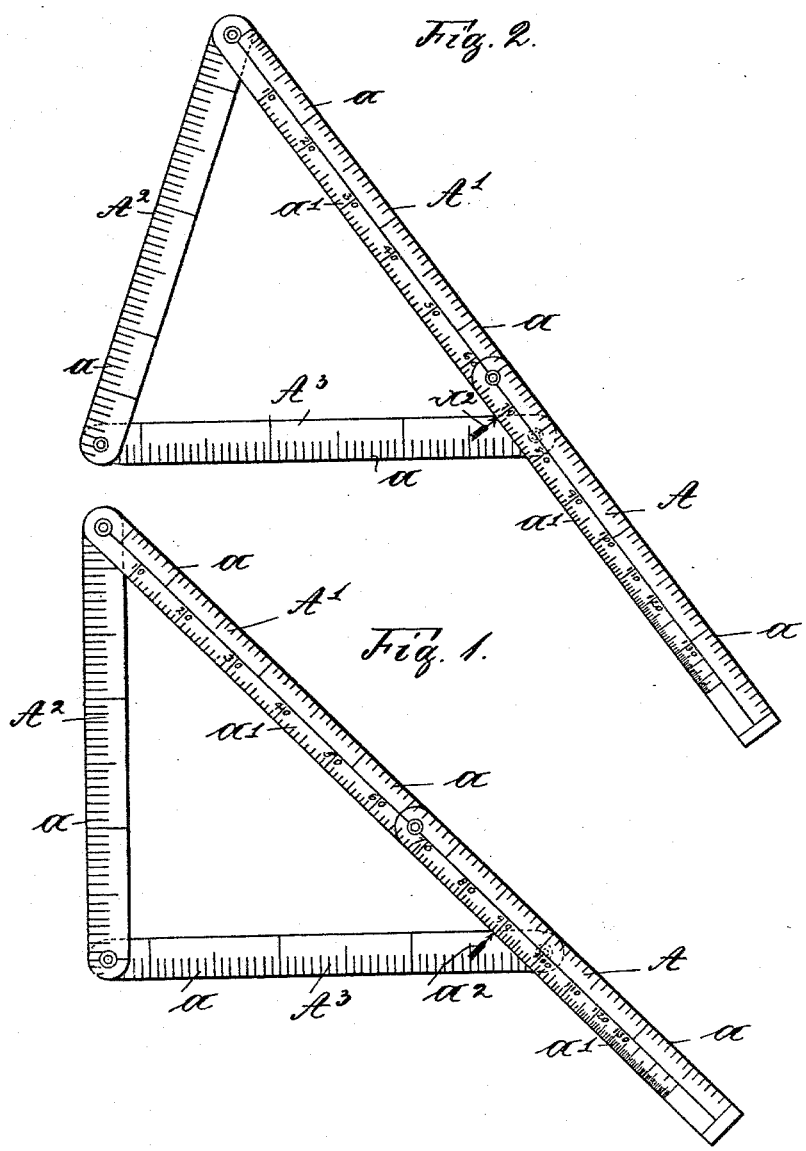

UNITED STATES PATENT OFFICE.

OSKAR SCHUBERT, OF BERLIN, GERMANY, ASSIGNOR TO LUDWIG HENRICH FERDINAND BRUNO HARBERS, OF HAMBURG, GERMANY.

JOINT-MEASURING SCALE.

SPECIFICATION forming part of Letters Patent No. 597,330, dated January 11, 1898.

Application filed June 1, 1897. Serial No. 639,020. (No model.)

*To all whom it may concern:*

Be it known that I, OSKAR SCHUBERT, a subject of the King of Prussia, German Emperor, and a resident of Berlin, in the Kingdom of Prussia, German Empire, have invented certain new and useful Improvements in Joint-Measuring Scales, of which the following is an exact specification.

My invention refers to joint-measuring scales of the common type; and the object of my improvements in measuring-scales of said type is to adapt the measuring-scale for use as a scale for determining angles. For that purpose I provide two links of the scale, besides the main scale or scale proper, with an auxiliary scale, the parts of which increase in length from the point of the highest number of degrees to the point of the lowest number of the same. Said auxiliary scale coöperates with a fixed point that is located on the second link from those bearing the said auxiliary scale, and on bringing that point in contact with any of the numbered lines of division of the auxiliary scale that number will show the numbers of degrees of the angle made by the link having the said fixed point and that link which is located between the former link and those provided with the auxiliary scale.

In order to make my invention more clear, I refer to the accompanying drawings, in which similar letters denote similar parts throughout the different figures, and in which—

Figure 1 shows a joint-measuring scale of my improved construction adjusted to represent a right angle. Fig. 2 shows the same joint-measuring scale adjusted to represent an acute angle, and Fig. 3 shows the joint-measuring scale adjusted to represent an obtuse angle.

The end link A and the adjoining link A' are provided, besides the main scale or measuring-scale proper, $a$, (which extends along the whole length of the joint-measuring scale,) with the auxiliary scale $a'$, mentioned hereinbefore. This scale extends only along the two links A and A', and the parts of the auxiliary scale increase in length in the direction from the link A to the link A', as distinctly shown in the drawings.

The fourth link $A^3$ of the joint-measuring scale has a fixed point $a^2$, (or arrow or other sign,) that is to coöperate with the scale $a'$ or with the parts and numbers of the same, respectively. The angle the number of degrees of which shall be determined is formed by the link $A^3$ and the link $A^2$, which connects the link $A^3$ with the links A' A.

In order to maintain the parts or links A A' in a straight line, these parts or links may be provided in any suitable and known manner with spring-catches. The latter may be omitted, as shown in the drawings, in which case the parts or links A A' are maintained in a straight line by the person using the measuring-scale.

There are, as a rule, six or eight links in the measuring-scale, and the whole length of the latter amounts to one meter. The other links must thus be supposed to be located below the link $A^3$.

If the arrow points, for instance, to the number "90" of the auxiliary scale $a'$, then the angle made by the links $A^2$ $A^3$ is an angle of ninety degrees. (See Fig. 1.) In any case that number of the auxiliary scale which the point of the arrow $a^2$ points to shows exactly the number of degrees of the angle made by the said two links.

In Fig. 2 the arrow $a^2$ points to the number "70," and the angle made by the links $A^2$ $A^3$ is thus an angle of seventy degrees.

In Fig. 3 the angle amounts to one hundred and ten degrees, as is proved by the arrow pointing to that number.

Having thus fully described the nature of this invention, what I desire to secure by Letters Patent of the United States is—

A joint-measuring scale having besides the main scale or scale proper an auxiliary scale extending over two links of the joint-measuring scale, and a fixed point located upon the second link from those having said auxiliary scale; the latter being divided in parts increasing in length from the point of the highest number of degrees to the point of the lowest number of degrees, and said parts being numbered to directly show the degrees of the angles made by the link having said fixed point and the link connecting the former link with those bearing the auxiliary scale, for the purpose as described.

In testimony whereof I have signed this specification in the presence of two subscribing witnesses.

OSKAR SCHUBERT.

Witnesses:
 JULIUS MAERNECH,
 FRITZ SPERLING.